United States Patent
McGrath et al.

(10) Patent No.: US 9,659,247 B2
(45) Date of Patent: May 23, 2017

(54) SYSTEM AND METHOD FOR EMPLOYING THE USE OF NEURAL NETWORKS FOR THE PURPOSE OF REAL-TIME BUSINESS INTELLIGENCE AND AUTOMATION CONTROL

(75) Inventors: Christie Patrick McGrath, Las Vegas, NV (US); Simon Byford Moss, Cos Cob, CT (US); Elizabeth Winters Elkins, Pompano Beach, FL (US); Thomas C. Fountain, Madison, NJ (US); Raul Hugo Curbelo, Sturbridge, MA (US)

(73) Assignee: PNEURON CORP., Nashua, NH (US)

( * ) Notice: Subject to any disclaimer, the term of this patent is extended or adjusted under 35 U.S.C. 154(b) by 273 days.

(21) Appl. No.: 12/870,348

(22) Filed: Aug. 27, 2010

(65) Prior Publication Data

US 2011/0055109 A1    Mar. 3, 2011

Related U.S. Application Data

(60) Provisional application No. 61/237,922, filed on Aug. 28, 2009.

(51) Int. Cl.
*G06Q 10/00* (2012.01)
*G06N 3/02* (2006.01)
*G06Q 10/06* (2012.01)

(52) U.S. Cl.
CPC ............. *G06N 3/02* (2013.01); *G06Q 10/06* (2013.01); *G06Q 10/067* (2013.01)

(58) Field of Classification Search
USPC .............................. 719/311; 706/15; 705/348
See application file for complete search history.

(56) References Cited

U.S. PATENT DOCUMENTS 6,738,760 B1 * 5/2004 Krachman ............ G06Q 50/16
7,685,083 B2    3/2010 Fairweather
(Continued)

FOREIGN PATENT DOCUMENTS

| JP | 2004-538542 | 12/2004 |
| JP | 2005-520224 | 7/2005 |
| JP | 2006-73007 | 3/2006 |

OTHER PUBLICATIONS

International Search Report for PCT Application PCT/US2010/046971, Nov. 11, 2010, US PTO.
(Continued)

*Primary Examiner* — Kira Nguyen
(74) *Attorney, Agent, or Firm* — Thompson Hine LLP

(57) ABSTRACT

A system and integration infrastructure to provide a distributed matrix or neural network of connected real-time decision support modules designed to perform business intelligence evaluations in real time. The system and integration infrastructure provide a network of intelligence superimposed upon any company's existing IT data centers, and cloud computing connections. The system is highly customizable to the unique business model deployed by the client company within the best practices of the client company's industry. Whether or not the client company has integrated their diverse enterprise systems, the elements of the matrix are annealed to the various data sources, transaction logs and client software installations currently deployed. These matrix elements or neurons are designed to house critical operational data, determined by the operational model of the client company to be of critical importance. When combined with monitor neurons, they automatically assess the gap between the desired state of a critical element and the current condition in real time. Trigger conditions are pre-established, but modified by an executive controller in real-time, and the system is pre programmed to automatically respond (Continued)

in a prescribed manner to critical conditions having been met even when these conditions come from otherwise stove-piped enterprise applications.

8 Claims, 4 Drawing Sheets

(56) References Cited

U.S. PATENT DOCUMENTS

| | | |
|---|---|---|
| 8,069,242 B2 | 11/2011 | Hadar et al. |
| 2002/0029340 A1* | 3/2002 | Pensak et al. ............... 713/182 |
| 2002/0131374 A1 | 9/2002 | Lee |
| 2002/0161624 A1 | 10/2002 | Bradlee |
| 2003/0033265 A1 | 2/2003 | Cabana et al. |
| 2003/0058277 A1 | 3/2003 | Bowman-Amuah |
| 2004/0122937 A1 | 6/2004 | Huang |
| 2005/0090908 A1 | 4/2005 | Tamura |
| 2005/0149459 A1 | 7/2005 | Kofman et al. |
| 2005/0234799 A1* | 10/2005 | Hansen et al. ............... 705/37 |
| 2006/0184410 A1 | 8/2006 | Ramamurthy et al. |
| 2006/0242155 A1 | 10/2006 | Moore |
| 2007/0078692 A1* | 4/2007 | Vyas ............................... 705/7 |
| 2007/0078929 A1* | 4/2007 | Beverly ................. H04L 12/66 709/204 |
| 2007/0094168 A1* | 4/2007 | Ayala et al. ................... 706/15 |
| 2008/0133287 A1* | 6/2008 | Slattery ........................... 705/7 |
| 2008/0201655 A1* | 8/2008 | Borchardt et al. ............ 715/767 |
| 2009/0030860 A1* | 1/2009 | Leitheiser ...................... 706/20 |
| 2009/0113049 A1 | 4/2009 | Nasle et al. |
| 2009/0254572 A1 | 10/2009 | Redlich |
| 2010/0064033 A1 | 3/2010 | Travostino et al. |
| 2010/0070448 A1 | 3/2010 | Omoigui |
| 2010/0070600 A1 | 3/2010 | Schulzrinne |
| 2010/0189099 A1 | 7/2010 | Bae et al. |
| 2010/0250497 A1 | 9/2010 | Redlich |
| 2010/0293123 A1 | 11/2010 | Barrett et al. |
| 2011/0131589 A1 | 6/2011 | Beaty et al. |
| 2011/0227754 A1 | 9/2011 | Hill |
| 2012/0102103 A1 | 4/2012 | Jacobson et al. |
| 2013/0086039 A1 | 4/2013 | Salch et al. |
| 2013/0086064 A1 | 4/2013 | Salch et al. |
| 2013/0091122 A1 | 4/2013 | Salch et al. |

OTHER PUBLICATIONS

Preliminary Report on Patentability for PCT Application PCT/US2010/046971, Feb. 28, 2012, WIPO.
International Search Report and Written Opinion, PCT/US2013/050673, mailed Mar. 4, 2014, 7 pages.
XMLNews.org, XML Basics, 1999, available at http://web.archive.org/web/20120627074440/http://xmlnews.org/docs/xml-basics.html, 6 pages.
Japanese Notice of Reason(s) for Rejection, Translation, JP2012-527026, mailed Feb. 4, 2014, 3 pages.
International Search Report and Written Opinion, PCT/US12/32726 mailed Aug. 17, 2012, 6 pages.
International Preliminary Report on Patentability, PCT/US12/32726 issued Oct. 8, 2013, 5 pages.
International Search Report and Written Opinion, PCT/US2012/069483, mailed Mar. 22, 2013, 7 pages.
Zhang et al., Migrating Legacy Applications to the Service Cloud, Object Oriented Programming, Systems, Languages and Applications (OOPSLA), 2009: Towards best practice in Cloud Computing. (2009) 59-68.
Sneed, Encapsulation of legacy software: A technique for reusing legacy software components, Annals of Software Engineering 9 (2000) 293-313.
Singapore Search Report, SG201201374-4 mailed Oct. 4, 2013 (6 pages).
Singapore Written Opinion, SG201201374-4 mailed Oct. 4, 2013 (10 pages).

* cited by examiner

SYSTEM AND METHOD FOR EMPLOYING THE USE OF NEURAL NETWORKS FOR THE PURPOSE OF REAL-TIME BUSINESS INTELLIGENCE AND AUTOMATION CONTROL

CROSS-REFERENCE TO RELATED APPLICATIONS

This application claims priority from U.S. Provisional Patent Application No. 61/237,922 Aug. 28, 2009 and incorporated fully herein by reference.

TECHNICAL FIELD

The present invention relates to the integration of software applications within the Information Technology (IT) infrastructure of companies of all sizes and more particularly, to a system and method for providing holistic, real-time control of such software application.

BACKGROUND INFORMATION

Since the 1950s, the world of high tech has been promising, or threatening, that computers would provide significantly increased Return On Investment (ROI) and measurable competitive advantage to those companies wise enough to invest heavily in computers within the infrastructure of their business operations. While most Fortune 500 companies bought into this assertion, few if any of them saw any significant increase in productivity, return on investment, or competitive advantage. Companies like IBM, GE, Burroughs, Univac, NCR, CDI, and Honeywell provided what would later be called mainframe computers that required special environmental and temperature controlled rooms along with an operational group to keep it up, and of course programmers if you wanted such computers to do anything. IBM dominated this group during the heyday of mainframe computing giving birth to the age of data processing along with the necessary aftermath—IT.

IT, or Information Technology, is the industry of professional software individuals who make their living feeding and taking care of the beast of computers dedicated to running the companies that represent the flagships of modern industry. As an industry, we have seen IT emerge from the early days of electronic data processing, to management information systems, to information systems to today's version of information technology. During this evolution, IT has seen the mainframe computer as a standalone device, later supplemented by minicomputer satellites, and later still threatened with replacement by huge versions of these mini-computers. The personal computer revolution made knowledge workers of just about every office employee, and once the PCs were connected to the world-wide-web (WWW), the revolution was on—globally.

Throughout all of this change, IT never became the keepers of the corporate infrastructure, the bastion of the implementation and automation of the killer business model. Not a single company overcame its competition based on an automated business model. If any company did, the media missed it. IT progressed smoothly in 10 years from the age of data processing to the information age. During this time, as technology changed, businesses were asked to reinvest in newer, more advanced technologies that worked on the more modern equipment and sometimes on new generation devices like mobile phones. The reputation of IT in general sagged through these years and IT became known for delivering applications that were too expensive to create and maintain completing systems late, and short of the specification goals committed to. The average IT project spanned 1-3 years and was already outdated by the time it was delivered.

Business's response to this was to get tough with funding and only implement industry standard systems. IT organizations were not trusted to 'roll (or design) their own' solutions, but were required to implement someone else's Enterprise grade software. The business units paying the tab required specific customizations, but these were functional business units that were not motivated to look at the bigger picture of the needs of the corporation, and thus only implemented parochial rather than universal solutions. Sales people had no idea as to the financial health of a prospect, because that information was stored in a system (an internal accounting system perhaps) that was not available to them.

IT in general was forced into a highly encumbered process of guaranteed deliveries in isolation from the customer needs. This made IT more successful, because it contained and controlled any risk they might have had to endure in the development process. Success was guaranteed, because the process was bulletproof. There was no reward for risk taking or innovation, and no reward for quick response to the ever changing needs of the business units.

Business Intelligence (or BI) has taken on the role of analyzing the oceans of data and information threatening to drown rather than inform the executives of business units. The approach has been to aggregate all data and information that might be important into a data warehouse. Cubes of this data can be statistically exercised by data analysts in the mere hopes of finding telling information that might better inform executives as to how to better shape their business model or take advantage of opportunities. This approach lacks the real time aspect of a neural network approach of distributed intelligence, and mostly disregards the modeling of what is important to watch in the IT application and data infrastructure.

The existing enterprise applications continue to function in the way they always have. There is no need to retrain, reinvent, or reprogram anything. Not everything needs to be integrated. There are mission critical processes in all business models and they provide the highest leverage in maximizing return with minimal incremental investment.

Wikipedia states in its Enterprise Application Integration entry that most EAI projects fail. A number of reasons are given including a paucity of consultants knowledgeable about middleware technology and the aspects of business models and processes, and how to "marry" them together. The most telling need is that most integrations are done to provide information to a single, isolated, but important application or function. Once you begin implementing in this fashion, you quickly realize that each connection you make is simply like another piece of thread in a garment. Documentation falls by the wayside early, and disaster strikes imminently. Wikipedia blames the lack of a common unifying structure as the core of the problem.

This invention, accordingly, provides that unifying structure in a network of distributed intelligence processors that can break us out of the Information Age and into the age of Intelligence exploitation. Creating plug ins to connect data and transaction sources to feed the intelligence system is done to whatever extent is necessary to provide guidance to the knowledge worker. This real-time decision support is based on information gathered via neural agents within the corporate infrastructure as interpreted by the rules assigned by the operational executive responsible for directing and utilizing the system.

This new approach to IT is based on the notion that you don't have to be an "authorized user" of a system within its core intention to need some of its data. It values the vision of the executives of the corporation as to the policies that should be enforced through the use of the company's automated systems, whether they were designed to operate together or not. It enables an unprecedented level of agility to the operational business units that use the various enterprise systems by reflecting changes in the rules of processing in real time, without reprogramming.

SUMMARY

The present invention features a system of intelligent neurons classified in several major categories, although more categories are anticipated and are within the ability of someone skilled in the art to develop. The installed system is modified and controlled by the Executive Control Module which simulates the deployed neural network. It addresses the same three categories of neurons as are deployed in the IT infrastructure, but enables the executive to tune the metadata that controls the decision.

The invention allows, provides the benefit of and performs "integration" of company wide data, without actually having to perform physical data integration. The purposes of integration are to be able to share data that is otherwise squirreled away in applications that are 'locked down' for very good reasons. Most obvious is that the company doesn't want to give an employee working at a call center access to the employee master file. However, if that employee knew more information about callers, he might be able to upsell them as he/she helps them. Thus corporations spend billions on integration to get access to data that is locked away in siloed applications. The expense is in moving the data to a central source and customizing the screens in applications to accommodate the sharing of that data and provide appropriate data access. This is horrifically expensive: doubling the cost of storage and burdening the network with the need to constantly synchronize transaction data.

The present invention peers into these systems and retrieves information that, by prescription of the corporate executives and experts, constitutes actionable intelligence and delivers it to a Heads Up Display that hovers over the application without having to change the application. This feature enables us to stay in synch with the latest release of the underlying application without having to rewrite the customized screens, yielding unprecedented agility, and lowering the Total Cost of Ownership of the underlying application. Thus, the present invention achieves all benefits of integration without suffering the expense or complexity associated with integration.

The present invention includes an Executive Control Model (ECM). The ECM, preferably implemented in software, is comprised of a modeling system and user interface that supports the creation of cross system interactions that define the operational policies of the corporation in general or of a new program, process, offering, or promotion that is to be superimposed over the current enterprise applications. This operational 'sandbox' is where executives can tweak their control system in isolation before deploying it for real. The ECM is built around the assumptive principles of System Dynamics. No business policy can be introduced to the system without first defining the desired behavior the architect wishes to promulgate. This empowers a measurement feedback loop that can give the executive feedback about how the system will achieve or miss its stated raison d'être. Once deployed in the real system, this feedback will be given as a periodic report to the executive controller with suggestions for tuning the policy to better achieve its stated goal. It is envisioned that future implementations of the system will make these adjustments automatically like a thermostat, informing the responsible executive post facto.

The present invention further includes Distributed agent neurons. These special purpose neurons sit close to the databases of each of the applications deployed by the company. They use existing service adapters, or ones that have been created for the purpose of integrating into the neuron network, to monitor activity within the application deemed important by the executives through the Executive Control System.

Also included in the invention are Application Interception Neurons. These perspective setting neurons intercept perspective information from the client side activity of the client/server application. These neurons use the perspective information to cull intelligence from the neural network to advise the knowledge worker using the application as to how to proceed. This happens through a Heads Up Display (HUD) that does not need to be integrated with the application in any other way.

Exemplar Enterprise Applications include CRM (Customer Relationship Management) and Customer Service Systems. Salespersons using the standard CRM systems like Siebel would be fed information from outside the system that the architects of the system (executives using the ECM system) thought important, like buying habits from the order entry system, or credit information from the SAP system, or information from the Gartner Group via cloud services. In the case of Customer Service, the incoming call provides the customer id, setting the perspective for the neural network. As the trouble ticket is being created by Clarify, for example, the neural network is providing background information on the customer via the HUD. Upgrade and Up sell advisories are posted along with customer drivers, like price, new technology, how impulsive the customer has been in the past and how satisfied they are with doing business with the company.

Also included in the invention as Cloud Neurons. These neurons act like distributed agent neurons, but they focus on cloud services provided by various vendors of cloud computing like AZURE from Microsoft and Force.com from Oracle rather than the databases of customer owned and operated enterprise application systems.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
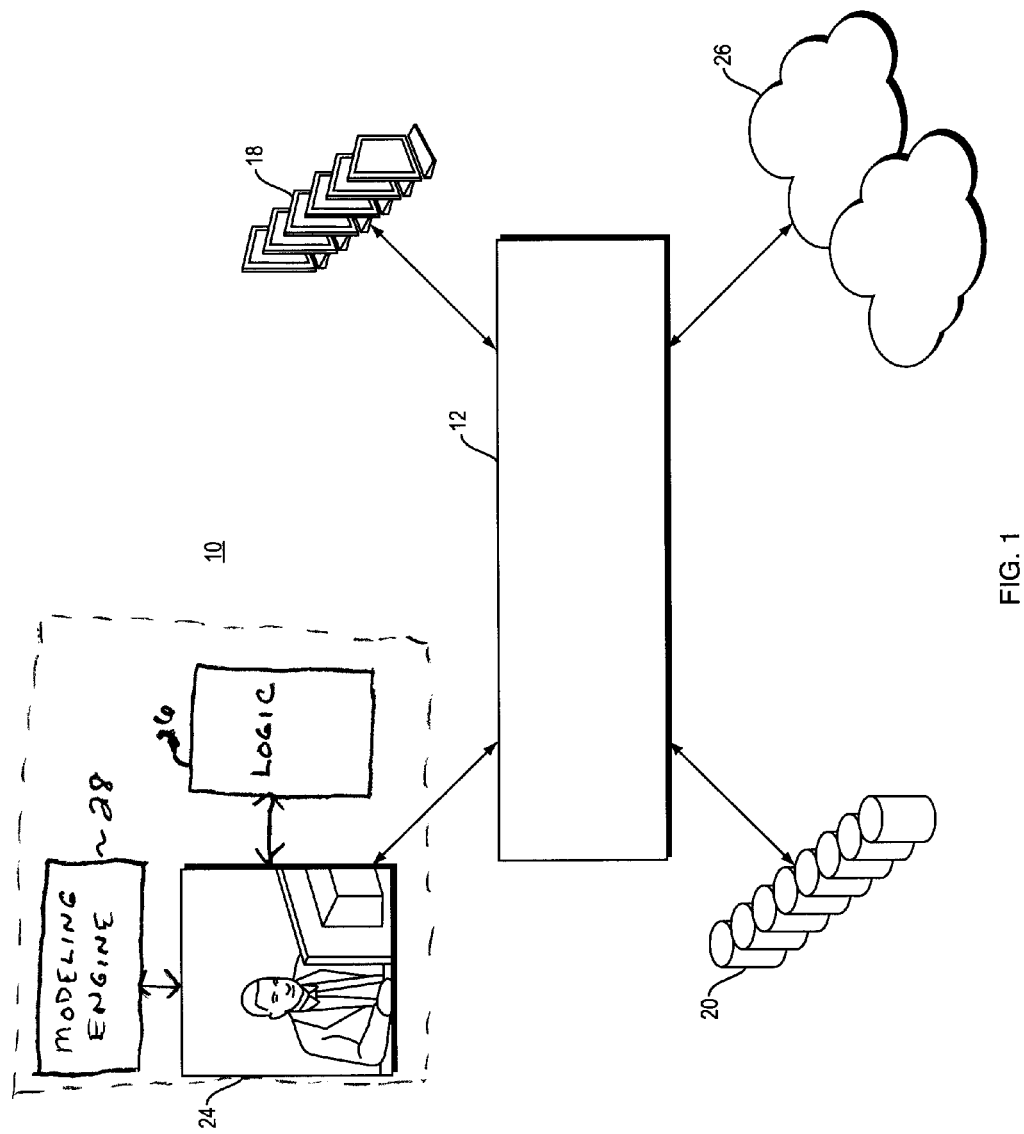
FIG. 1 is an overview of three categories of neurons utilized by the present invention.

FIG. 1 is an overview of an enterprise 10 incorporating the system and method of the present invention, including several categories 12 of neurons (that will be described in detail below) deployed as a comprehensive infrastructure to take control of an enterprise 10 and connect knowledge workers 18 to intelligence gathered from siloed application data 20 and or cloud services that was previously hidden from them. This is the top level generic view of the entire system The Data Silos 20 containing various enterprise application data use the neurons 12 (as will be described in connection with FIG. 2 below) to mine data stored in the silos 20 and/or to monitor activity logs (not shown).

The Knowledge Workers 18 (enterprise employees/users) preferably have a heads up displays (HUDs) on their desktops that bond to their proprietary enterprise applications, feeding perspective data and suggestions, such as customer heuristics, buying trends and habits, impulsiveness, sensitivity to up sell or cross sell pressure, current receivables status and history and the like to the Knowledge Workers 18. The HUD may manifest itself as an advisor window and take the form most suitable for the specific enterprise application.

Figure 2:
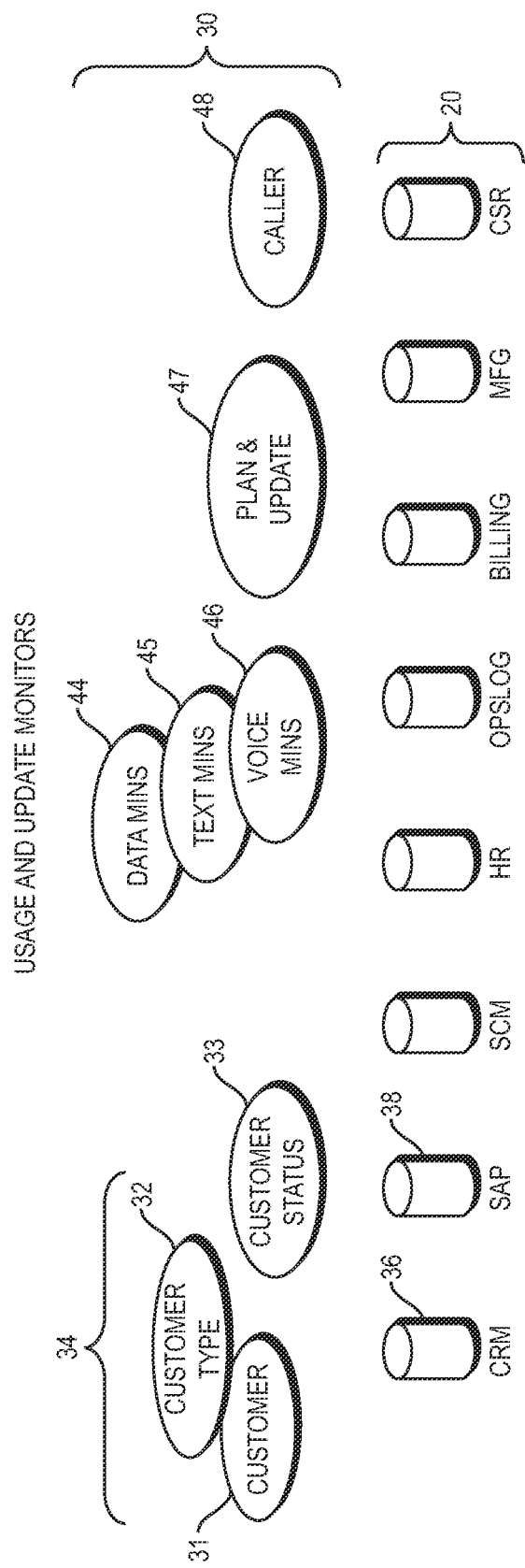
FIG. 2 depicts specific neurons in the network deployed as knowledge gatherers atop the databases of the siloed applications according to the present invention.
Figure 3:
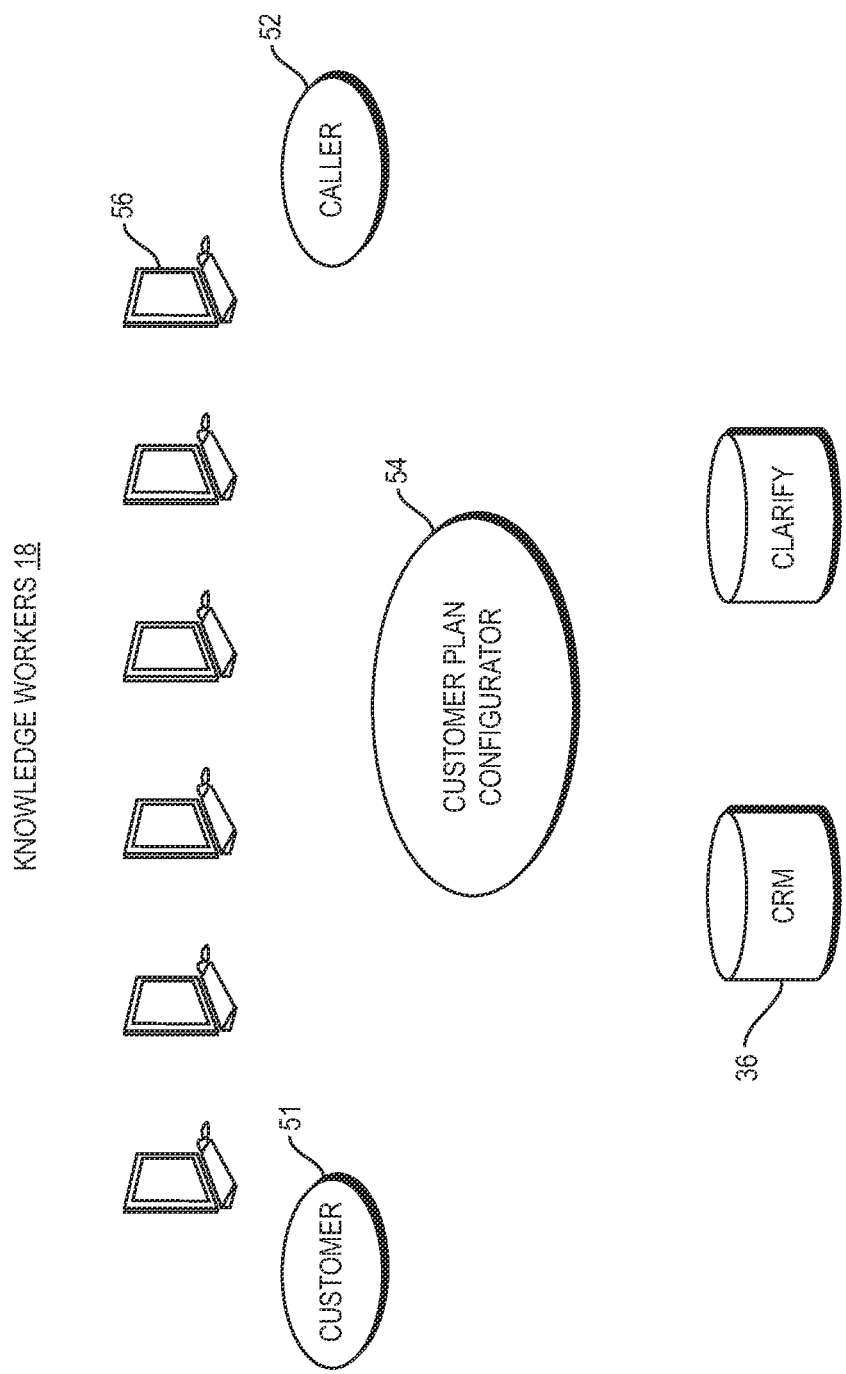
FIG. 3 illustrates perspective neurons (customer(1) and caller(2)) used to interact within the processes of existing applications in accordance with the teachings of the present invention.

The Executive Controller Module 24 is preferably implemented as software and allows the system data or enterprise data manager to create and modify policies that effect how the data monitor neurons 30, FIG. 2 and Application Interception neurons 51 and 52 FIG. 3 act, how the knowledge worker HUDs work, and reports on effectiveness of policies on a near-real time basis.

Cloud computing is a style of computing in which dynamically scalable and often virtualized resources are provided as a service (i.e. Cloud Services) over the Internet. Cloud computing is a general term for anything that involves delivering hosted services over the Internet. These services are broadly divided into three categories: Infrastructure-as-a-Service (IaaS), Platform-as-a-Service (PaaS) and Software-as-a-Service (SaaS). The name cloud computing was inspired by the cloud symbol that's often used to represent the Internet in flowcharts and diagrams.

A cloud service has three distinct characteristics that differentiate it from traditional hosting. It is sold on demand, typically by the minute or the hour; it is elastic—a user can have as much or as little of a service as they want at any given time; and the service is fully managed by the provider (the consumer needs nothing but a personal computer and Internet access). Users need not have knowledge of, expertise in, or control over the technology infrastructure in the "cloud" 26 that supports them. Cloud services are available, for example, from Microsoft Corporation, Amazon, Force-.com, and a few others. The present invention is agnostic about programming languages, operating system environments, web application servers, and most technical choices made by an IT organization in the past. The invention is also indifferent as to the source of information that can be used to distill business actionable intelligence.

Most large global companies have no need for Cloud Services. They have already invested heavily in highly customized Enterprise Software. As you move down the chain to smaller than global entities, however, the need for software as a service, due to the lack of investment in a critical area of enterprise software, begins to emerge. Cloud Services 26, in effect, opens the flood gates of raw information to the smaller business, effectively flooding them, the way global enterprises are flooded with their own proprietary data.

The system 10 of the present invention can be implemented to assimilate information from any source, introducing its relevance to a business' business model in real time, and stimulating any automated activity deemed important by the executives of the business.

FIG. 2 depicts specific neurons in the network deployed as knowledge gatherers atop the siloed application data 20. The first category of neurons includes data farmers or condition monitors 30. In the example of a mobile telephone carrier, the carrier has determined that they must regain lost market share while the economy is down. To do this, they must know their customers better. Assigning a customer to a taxonomy (cust_type) (32) does not mean that the customer is impervious to the pressures associated with other drivers. For instance, an affluent customer, lost to AT&T because of the iPhone, will be categorized as driven by having the latest toy. It doesn't infer that they wouldn't be moved by an unsolicited call, offering to change their plan to accommodate and eliminate a $500 overcharge this month for unplanned minutes spent by one of their children overspending their text allocation in their first month of College. This taxonomy is used to direct the CSR (Customer Service Rep) toward the 'deal sweeteners' with the highest appeal. There is no reason why this has to be a singular taxonomy. It might be wise to capture a hierarchy of "drivers" that will uniquely identify the customer's spending characteristics rather than group them. The one or more monitors or neurons 34 on or associated with the business' CRM system 36 will gather the information from the Ops Log History and report the changes to the one or more neurons 34. The neuron 34 receives the message, updates its state and evaluates the message based on its rules. If the execution rules are met, the neuron notifies the heads up display of the knowledge worker (FIG. 1) with a prescribed message which is conveyed through the user experience to the knowledge worker 18 along with prescribed recommendations associated with the condition described in the message. The term User eXperience (UX) is in common usage today. It is a higher abstraction of the User Interface (UI) or Graphical User Interface (GUI). It addresses the entire user experience, including the incorporation of telephones or additive, advisory displays like the HUD. For example, if the customer has been categorized as an impulse purchaser who is driven by the need to have the latest toy, the system will advise that the new plan that the enterprise is trying to sell them may include a new phone that is not yet available but would be included in the new plan.

The customer neuron 31 is a state condition set by either the sales guy in the CRM system, a workflow that sets this state to 'focused', or the engagement of a CSR by phone, chat, twitter, or other contact initiated by the customer.

The customer status neuron 33 holds the financial state of the current customer in focus. The complexity of this neuron will vary from client to client. The simplest version is that the customer status neuron 33 on top of the Systems, Applications and Products (SAP) 38 will query and maintain status changes for all customers in a binary fashion. 1=status good, 0=status delinquent. In the more sophisticated versions, a business may engage cloud services to track changes in their credit score, current credit card balances, or whatever to determine up-sell capacity.

The Caller neuron (48) is set with the Unique Identifier (UID) of the customer who has just initiated contact with the business, assuming it has come from a passive source like the Web. This may also be set in the case of a phone call to a Customer Service Rep.

The Plan neuron (47) maintains the meta-data based a description of the Customer's current plan, including renewal date. In this simplified model, plans are made up of the monthly limits associated with only three elements, Data surfing minutes using the customer's device as a browser, Text Messaging Minutes, and Voice telephony minutes.

Within the neuron are stored Metadata rules that are unique and specific to its purpose. In the case of a monitor neuron, the variable or data name is stored as the element to be monitored. This data name is specific to the data schema of the database being monitored by said neuron. For example, in the mobile telephony example, a neuron could be created to monitor the customer's current accumulated number of text messages in the current billing period. This value is compared whenever it changes to the limit of the customer's plan. The Executive Control Model will have determined the rule to apply to the comparison. The simplest rule would be that if the amount of messages exceeded the limit by a certain amount, the rule would fire the SPU to change the state of the neuron, construct a message and transmit the message to another neuron (that may be monitoring a related condition) or transmit the message to the workflow initiation module of the CRM (Sales) system that would create a workflow that would show up in the in basket of the account representative who owned this customer account.

With the customer set as focus or perspective, the data, text and voice minutes neurons (44, 45, and 46) maintain the current state of these three dimensions of standard plans. They have, built within their metadata rules, proximity alarms that will change their state from normal to concerned and to critical. These changes are triggered within the specific customer's instance as the data changes within the customer usage log. The Executive control system 24 sets and manages these thresholds on a real time basis, thus controlling when an action or event is fired; for instance, contact the customer with a relief plan.

FIG. 3 illustrates perspective neurons (customer (51) and caller (52)) used to interact within the processes of existing applications enhancing the quality of decision making on the part of the knowledge worker.

Knowledge Workers 18 run the client side of enterprise applications. They include sales and customer service representatives, although they are far from limited to these individuals. We will focus on them since they represent the customer facing side of a business' business model; however it is understood that the present invention can be utilized by or implemented on behalf of various individuals having various titles and responsibilities within a given organization.

This also introduces the 'transaction (or application) interception' class of neurons 51, 52 and 54. As a call is received, the caller is identified within the Customer Service Application and the perspective neuron is set to that ID. The 'transaction or application interception' neurons 51, 52 and 54 interact with their farmer/monitor counterparts (neurons 31 through 46 in FIG. 2) in the same network. Their primary function is to intercept transaction data on the fly from siloed application data 20 and to feed the knowledge worker useful intelligence at just the right time.

In this simplified illustration, we see the desktops 56 of the sales and customer service knowledge workers 18. They are primarily running instances of Siebel and Clarify Enterprise software systems. The difference is that their perspective is set by in-coming calls for help (caller) (mostly unless an outgoing policy is created in the executive controller for the Clarify users) and the customer in the out-bound call work packet in Siebel.

The present invention sets the knowledge worker's 18 perspective based on one of these neural states for that user's desktop. All associated intelligence is displayed in the Heads Up Display (HUD) along with any rules imposed by programs in place as dictated by the executive control system 24. This includes special offers, early previews of new phones, forgiveness of overage in exchange for a new 2 year contract, etc. This HUD acts as a business development, intelligent advisor that knows all about what information the business executives are willing to give up to expand the business. In this case, it can create a custom plan for each customer and feed it to the representative and Billing system. Any forgiveness of debt will have to be forced as an override to the billing system and to the SAP system. This is accomplished automatically within the neural net by triggering update neurons 47 that fire additional transactions with acknowledgements.

Figure 4:
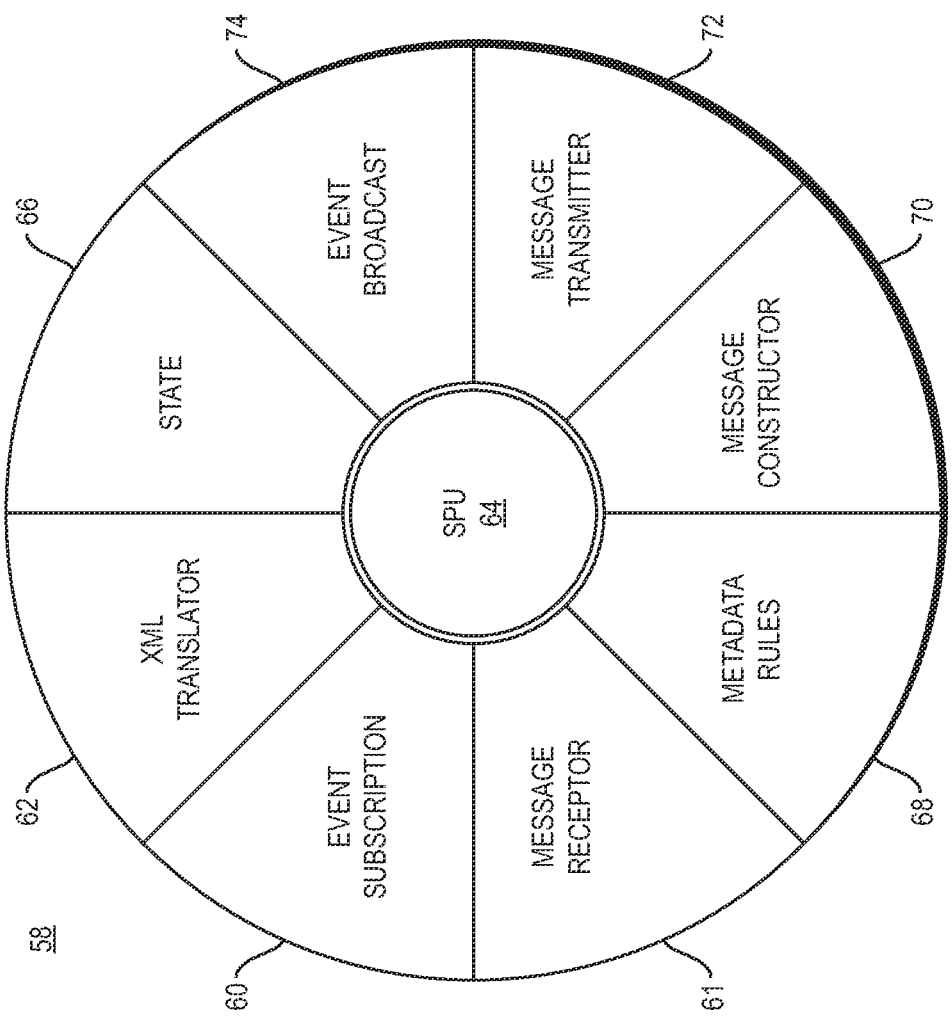
FIG. 4 is a diagram of a business intelligence neuron according to the present invention.

FIG. 4 is a diagram of a generic business intelligence neuron 58 explaining its components and how it fulfills its purpose. A neuron is a software object that contains seven (more or less) primary methods or tasks. It is capable of interacting within the neural network in a number of ways. There are many types of neurons, but they all share this common prototypical construction.

The neurons are all generally capable of subscribing to and receiving notification of system events, 60 and receiving messages 61; they are all capable of parsing XML messages and compiling them to the binary form recognizable by the SPU, 62; they are all based on a 'soft processing unit' or spu, 64 (this the neural network equivalent of a CPU in a computer, it can process a stream of binary codes and perform it's primary purpose once it receives the appropriate code stream); they are all capable of setting and preserving their state, 66 (the state is persistent, similar to SRAM); they are all capable of storing a metadata based rules matrix 68 that will determine whether or not the primary function is executed and in what way, (the primary function is expressed as some combination of state setting, Message construction 70, Message Transmission 72, and event broadcast 74); and they are all capable of constructing outgoing messages and of transmitting outgoing messages to the enterprise message bus or to a list of neuron receptors 70, 72 and 74.

The unique instance of a neuron is defined by its rules, perspective and focus. Perspective is the target of its core purpose. An example of perspective is customer. The depth dimension of a neuron may be viewed as instances tracking individual customers. This can be visualized as a 'stack' of neuron clones with most elements held consistent across instances, but some like 'state' stored uniquely.

It is the nature of a neuron to be extremely small, simple and provide very simple processing, but as part of a complex network of inter-reactive neurons they can be assembled to serve much more complex purposes.

The primary target for neural network enhancement is a company that has already seen the value in breaking down the walls of siloed applications to enhance the performance of knowledge workers in mission critical functions. The invention is designed to anneal to an existing IT infrastructure without regard to programming language, operating system, or communication technology.

In the perfect implementation, the company will have already deployed Enterprise Applications pertinent to their business model within their industry along with an Enterprise Message Bus, like TIBCO for example.

The neural consultants will focus on understanding the 'best practices' published for the company's industry, and determine where the most leveraged processes exist within the company. They will then model the existing system in the Executive Controller Simulator. This model is then shared with the executives of the company. The neural network consultants then poke and probe the executives deepest desires for the way that they would like the company to perform. Adjustments are made to the model, and the consultants begin to build out the neural network to support the model in the simulator.

This process includes building adaptors, standard services interfaces built on top of the application databases, where necessary for the databases of existing systems, creation of permissions across the various applications to be connected to the neural network, interceptor agents, as described in FIG. 3, for the targeted mission critical applications to be enhanced, and the design and implementation of custom HUDs (Heads Up Displays) designed to interact with the knowledge workers of the designated mission critical applications. Finally, any deficiency in the distributed neural network deemed important to fill by the operational executives that can be supplemented by available software services made available by any of the cloud computing vendors (AMAZON, Microsoft, Force.com, etc) will be provided by cloud computing neurons created to monitor information retrieved from the cloud services provider. These neurons react and interact with the network like any other neuron within the system, giving the company the power to automatically react to conditions outside of its proprietary data centers, like changes in the prognosis of future activities within an industry as predicted by Forrester or Gartner, or changes in and industry subsection of the S&P 500.

When the neural network is ready, the executive controller releases the current metadata to the neurons within the IT infrastructure which activates them. From this point on, the IT infrastructure of the company is forever bonded to the will of the executives as expressed by them through the executive controller 24. New pricing can be rolled out from here; new sales programs with incentives can be created here; modifications of policies will be rolled out from here in real time and can be changed from moment to moment, giving operational executives real-time agility into the controls of their company.

Modifications and substitutions by one of ordinary skill in the art are considered to be within the scope of the present invention, which is not to be limited except by the allowed claims and their legal equivalents.

What is claimed is:

1. A distributed processing system for business intelligence and automation control, comprising:
    a monitor business intelligence object that
        is hosted on a first computer that is communicatively coupled across an electronic communication network to a second computer,
        is configured to monitor activity that occurs in a first business application software system hosted on the second computer,
        includes a database that contains a set of enterprise application data, and
        includes an enterprise application coupled to the database;
    an application interception business intelligence object that is
        hosted on the first computer;
        configured to monitor activity directed to the first business application software system, and
        configured to intercept information generated by a client-side application of a second business application software system hosted on the first computer; and
    an executive control module that is configured to control creation and operation of both the monitor business intelligence object and the application interception business intelligence object;
    wherein each of the monitor business intelligence object and the application interception business intelligence object includes
        a set of message communication components configured to support communication with the executive control module,
        a metadata-based rules matrix component that is configured to define parameters of execution of a primary function of an associated one of the monitor business object and the application interception business intelligence object as directed by the executive control module, and
        a processing component.

2. The system of claim 1 wherein the set of message communication components further include
    a message receiving component,
    a message translation component,
    a message construction component, and
    a message transmission component.

3. The system of claim 1, wherein the executive control module further includes a logic for
    directing monitoring and interacting of the monitor business intelligence object and the application interception business intelligence object with the first and second business application software systems, and
    directing monitoring and interacting between monitor business intelligence object and the application interception business intelligence object.

4. The system of claim 1, wherein the monitor business intelligence object retrieves data from the database of the first business application software system.

5. The system of claim 4, wherein the executive control module further includes a modeling engine for simulating a system state based on the effect of interactions between the monitor business intelligence object and the application interception business intelligence object.

6. The system of claim 4, wherein the executive control module further includes a graphical user interface that enables a user to control said executive control module and supporting creation by the user of cross system interactions.

7. The system of claim 4, further comprising a heads up graphical user interface displaying actionable intelligence information delivered in a message based at least in part on
    information contained in a message sent by the monitor business intelligence object and
    information contained in a message sent by the application interception business intelligence object.

8. The system of claim 7, wherein
    the application interception business intelligence object is configured to identify an activity as a match of an interception parameter set forth in the metadata-based rules matrix component of the application interception business intelligence object;
    the application interception business intelligence object is configured to send a first message to the monitor business intelligence object with the direction to retrieve data from the database of the first business application software system upon the match of the interception parameter;

the monitor business intelligence object is configured to identify the retrieved data as a match of a monitor parameter set forth in the metadata based rules matrix component of the monitor business intelligence object; and the monitor business intelligence object is configured to send a second message to the heads-up graphical user interface for display of a set of actionable intelligence information included within the second message upon the match of the monitor parameter.

\* \* \* \* \*